May 26, 1959 R. M. RINGOEN 2,888,646
LOW NOISE FREQUENCY MODULATOR AND EXCITER
Filed April 1, 1957
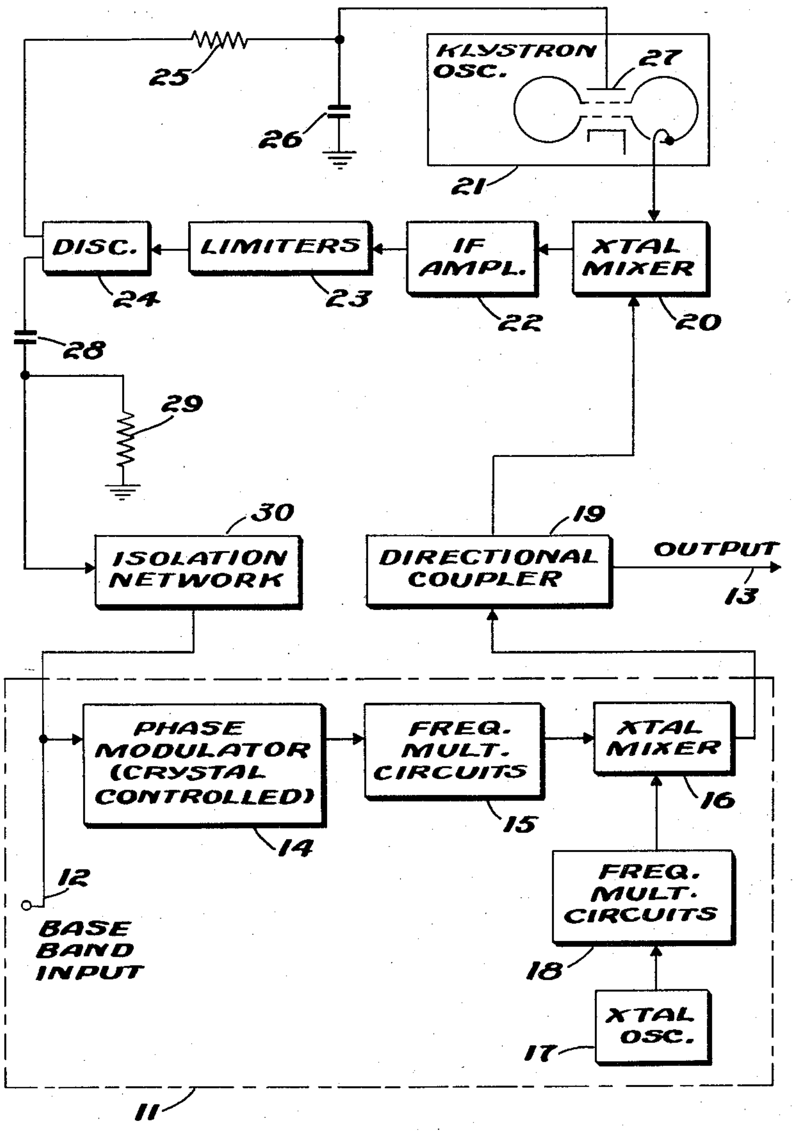
INVENTOR.
RICHARD M. RINGOEN
BY [signature]
ATTORNEY

United States Patent Office 2,888,646

Patented May 26, 1959

2,888,646

LOW NOISE FREQUENCY MODULATOR AND EXCITER

Richard M. Ringoen, Cedar Rapids, Iowa, assignor to Collins Radio Company, Cedar Rapids, Iowa, a corporation of Iowa Application April 1, 1957, Serial No. 649,739

2 Claims. (Cl. 332—7)

This invention pertains to ultra-high-frequency modulator-exciters in radio transmitter circuits and particularly to feedback control circuits for reducing noise and distortion in the output circuits of modulator-exciters. To obtain most reliable service, equipments for use in line-of-sight relay communications require control circuits for stabilizing frequency and for reducing noise and distortion. For example, reflex klystron electron tubes have been used in modulator-exciters in communication equipment for operating in the ultra-high range of frequencies. Noise generated within the modulator-exciter by the klystron tube is generally less than that generated in modulator-exciter circuits that use frequency multiplier circuits in combination with electro-vibratory elements for frequency control. However, the frequency stability of the exciter using the klystron tube is no better than .05% when frequency control circuits are not used, and is therefore inadequate for application to communication systems operating within a narrow band of frequencies. Modulator-exciters that utilize frequency multipliers in combination with electro-vibratory elements such as quartz oscillator plates for frequency control are more desirable than those using klystron tubes in that they have much better frequency stability than that of klystron circuits but they are less desirable in that the noise-to-signal ratio is substantially greater. The instant invention utilizes a modulator-exciter circuit controlled by electro-vibratory elements in combination with a negative feedback circuit that utilizes a low noise oscillator and a highly linear discriminator.

An object of the present invention is to provide in a modulator-exciter electro-mechanical vibratory frequency control means in combination with a feedback circuit to reduce noise and distortion in the output of the modulator-exciter.

Another object is to employ in the feedback circuit an oscillator that utilizes a vacuum tube of the electron velocity-modulated type in order to minimize noise in the output of the modulator-exciter.

And still another object is to reduce distortion in the output of the modulator-exciter through control of modulation characteristics by a linear discriminator in the feedback circuit.

These objects, the following description, and the appended claims are more readily understood by reference to the accompanying single drawing in which is shown a block diagram of a crystal-controlled modulator-exciter that utilizes a negative feedback circuit.

The modulator-exciter 11 of the accompanying drawing is conventionel. A modulating signal is applied to input line 12 and a modulated microwave signal is obtained from output line 13. The input signal is applied to phase or frequency modulator 14 which may be of the delay-line type or other types well known in the art. For this application the center frequency of the phase modulator should be precisely controlled, for example, by electro-mechanical vibratory means. A modulator of the type that includes a crystal oscillator, a saw-tooth multivibrator, and an amplifier which is biased beyond cut-off is satisfactory. A modulator of this type is described in U.S. Patent No. 2,280,693 issued to J. Evans on April 21, 1942. As shown in this reference, a signal from the crystal-controlled oscillator controls the saw-tooth multivibrator. Signals from the saw-tooth multivibrator and from a source of modulating signal are applied to the biased amplifier to generate a phase or frequency modulated signal in a resonant circuit that is in the plate circuit of the amplifier. Through this arrangement, the center frequency of the modulated signal is precisely controlled by the crystal oscillator.

The output of the modulator 14 is applied to frequency multiplier circuits 15 wherein the frequency of the modulated signal is greatly increased. Further, multiplication of frequency is obtained by applying the output of the frequency multiplying circuits to crystal mixer 16. The modulated signal that is applied to the crystal mixer is heterodyned with a signal that is derived from conventional crystal oscillator 17 and frequency multiplier circuits 18. The signal which is now at the desired frequency for application to external circuits is applied through directional coupler 19 to output line or waveguide 13. The output signal has stable frequency characteristics but, without additional control circuits, it has an undesirable signal-to-noise ratio because of the relatively large amount of noise generated by the crystal and mixer circuits.

In order to reduce the noise in the output circuit of the modulator-exciter, a feedback circuit is connected between the output circuit 13 and the input circuit 12 of the modulator-exciter. This circuit functions according to well-known negative feedback theory to apply out-of-phase signal to the input of the modulator for reducing distortion and noise in the output of the modulator-exciter.

This feedback circuit, which is a heterodyne circuit, includes a low-noise oscillator and a discriminator that has nearly perfect linear characteristics. Of those circuits connected to the feedback loop that includes the modulator-exciter circuits and the feedback circuits, only the low-noise oscillator is outside of the closed feedback loop for reducing noise. It is, therefore, particularly important that the oscillator be selected for its low-noise characteristics since the signal-to-noise ratio at the output of the modulator-exciter will be greatly dependent upon this oscillator. In order to maintain the modulation characteristics of the modulator-exciter as nearly linear as possible, the discriminator 24 in the feedback circuit should be designed to have a minimum of distortion.

A coupling probe or loop within directional coupler 19 is connected to an input circuit of crystal mixer 20. The output of klystron oscillator 21 is connected also to crystal mixer 20 for heterodyning with the output signal of the modulator-exciter. The difference frequency derived from the crystal mixer is applied through intermediate-frequency amplifier 22 and limiters 23 to discriminator 24. The conventional intermediate-frequency amplifier has sufficient bandwidth to pass the frequency band of the modulating signal and its significant sidebanding components derived from the output of the modulator-exciter. The demodulated signal from discriminator 24 is applied through a low-pass filter to the frequency controlling circuits of low-noise oscillator 21 and is applied through a high-pass filter to the input circuits of phase or frequency modulator 14.

In a preferred arrangement for a microwave system, the low-pass filter consists of resistor 25 and capacitor 26 for applying signal variations below 30 cycles per second to the repeller 27 of klystron oscillator 21. The control voltage that is applied to repeller 27 is in proper phase for stabilizing the oscillator frequency relative to the center frequency present in the output of the modulator-exciter. Therefore, the difference frequency that is applied from crystal mixer 20 to intermediate-frequency amplifier 22 is maintained substantially constant. The high-pass filter that is connected to discriminator 24 consists of capacitor 28 and resistor 29 for applying signal variations above approximately 30 cycles per second through isolation network 30 to the input circuit of phase modulator 14. To reduce noise and distortion, the output of the high-pass filter is out of phase with the incoming signal that is applied to line 12.

The operation of the low-noise frequency-modulated exciter of this invention is more readily understood with reference to a particular example. The baseband input signal consists of a band of frequency upon which is impressed several signals according to usual practice in multiplex communication systems. The phase modulator 14 has frequency-determining circuits for generating a phase-modulated signal with a center frequency at 10 megacycles. This 10-megacycle signal is multiplied in frequency multiplier circuit 15 to 100 megacycles for application to crystal mixer 16. A one-megacycle output from crystal oscillator 17 is applied through frequency multiplier circuits 18 to crystal mixer 16. The two signals that are applied to the crystal mixer are heterodyned to produce a signal at 1,000 megacycles for application through directional coupler 19 to output line 13.

A small portion of the signal is applied from the directional coupler to crystal mixer 20 to be heterodyned with a 990-megacycle signal from low-noise reflex klystron oscillator 21. The difference signal of 10 megacycles is applied through I.-F. amplifier 22 and limiters 23 to discriminator 24. In the event that the 10-megacycle signal is slightly in error so that the center frequency does not correspond with the resonant frequency of discriminator 24, a low-frequency control voltage is produced for application through the low-pass filter to repeller 27 of the klystron oscillator. This voltage has proper polarity as determined by the direction of departure of the I.-F. frequency from the resonant frequency of the discriminator to change the oscillator frequency as required for stabilizing the I.-F. frequency.

Demodulated signal above 30 cycles per second is applied through the high-pass filter to the input circuit of phase modulator 14. Obviously, this signal contains noise that has been generated in phase modulator 14, in oscillator 17, and in other circuits of the modulator-exciter. The phase of signal as applied from the feedback circuit to the modulator is such that the noise within the modulator-exciter circuits is reduced according to usual negative feedback theory. The reduction of noise is directly proportional to the amount of feedback. Twenty db feedback may be proveded for good noise reduction. Modulation characteristics of the modulator-exciter will be largely determined by the characteristics of discriminator 24.

Although this invention has been described with respect to a particular embodiment thereof, it is not to be so limited as changes and modifications may be made therein which are within the full intended scope of the invention as defined by the appended claims.

What is claimed is:

1. A heterodyne feedback circuit including a mixer, a discriminator, and a low-noise oscillator in combination with a high-frequency modulator-exciter; said low-noise oscillator having an electronic tube of the velocity-type and having a frequency controlling circuit to which voltage is applied to stabilize the operating frequency of said oscillator, said modulator-exciter having an input circuit to which modulating signal is applied and an output circuit for modulated radio-frequency signal, said output circuit and said oscillator being electrically connected to said mixer for applying modulated radio-frequency signal and oscillator signal respectively thereto, means for applying heterodyne signal from said mixer to said discriminator, a low-pass filter connecting said discriminator to said frequency controlling circuit, a high-pass filter connecting said discriminator to the input circuit of said modulator-exciter, said low-pass filter passing low-frequency variations in voltage to said controlling circuit for stabilizing the frequency of said low-noise oscillator, and said high-pass filter passing noise and demodulated signal voltages to the input circuit of said modulator-exciter for reducing noise and distortion in said output circuit.

2. A heterodyne feedback circuit including a mixer, a discriminator, and an oscillator with a reflex klystron vacuum tube in combination with a high-frequency modulator-exciter; said reflex klystron tube having a repeller that is responsive to voltage change for changing the frequency of operation of said oscillator, said modulator-exciter having an input circuit to which modulating signal is applied and an output circuit for modulated radio-frequency signal, said output circuit and said oscillator being electrically connected to said mixer for applying modulated radio-frequency signal and oscillator signal respectively thereto, means for applying heterodyne signal from said mixer to said discriminator, a low-pass filter connecting said discriminator to said repeller, a high-pass filter connecting said discriminator to the input circuit of said modulator-exciter, said low-pass filter passing low-frequency variations in voltage to said repeller in required phase for stabilizing the frequency of said low-noise oscillator, and said high-pass filter passing noise and demodulated signal voltages to the input circuit of said modulator-exciter in required phase for reducing noise and distortion in said output circuit.

References Cited in the file of this patent

UNITED STATES PATENTS

| | | |
|---|---|---|
| 2,469,875 | Fyler | May 10, 1949 |
| 2,672,589 | McLeod | Mar. 16, 1954 |
| 2,748,284 | Segerstrom | May 29, 1956 |